United States Patent [19]
Zysset

[11] Patent Number: 5,282,531
[45] Date of Patent: Feb. 1, 1994

[54] METHOD AND APPARATUS FOR INDEXING CAN ENDS

[75] Inventor: Edgar H. Zysset, St. Cloud, Fla.

[73] Assignee: Crown Cork & Seal Company, Inc., Philadelphia, Pa.

[21] Appl. No.: 922,163

[22] Filed: Jul. 29, 1992

[51] Int. Cl.⁵ ............................................. B65G 13/02
[52] U.S. Cl. ................................................ 198/803.14
[58] Field of Search ...................... 198/803.14, 803.15, 198/688.1, 689.1

[56] References Cited

U.S. PATENT DOCUMENTS

| | | | |
|---|---|---|---|
| 4,671,720 | 6/1987 | Debenham et al. | 198/689.1 |
| 4,799,846 | 1/1989 | Wissman et al. | 198/803.15 X |
| 4,946,028 | 8/1990 | Eichmann et al. | 198/688.1 |
| 5,151,001 | 9/1992 | Kawaguchi et al. | 198/803.15 |

*Primary Examiner*—Cheryl L. Gastineau
*Attorney, Agent, or Firm*—Woodcock Washburn Kurtz Mackiewicz & Norris

[57] ABSTRACT

A method of transporting a can end of the type which has a circumferential end curl portion and an interior shoulder, so that an upper edge of a prefabricated can body may be fitted between the end curl portion and interior shoulder to form a sealed can, includes steps of placing the can end on a movable support surface in such a manner that only the circumferential end curl portion of the can end is contacted by the movable support surface; and moving the movable support surface with the can end so supported thereon, whereby the interior shoulder of the can end will not be interfered with by the movable support surface during transport. An indexing belt for performing the method is also disclosed. The method and belt permit a can end which has sealant or adhesive on its interior shoulder to be transported without adhering to the transport mechanism.

3 Claims, 2 Drawing Sheets

METHOD AND APPARATUS FOR INDEXING CAN ENDS

BACKGROUND OF THE INVENTION

1. Field of the Invention

This invention relates to methods and systems which are used to assemble containers for the packaging industry. More specifically, this invention relates to an improved indexing belt for transporting can ends from one processing position to another before the can end is assembled into a finished container.

2. Description of the Prior Art

Metallic cans are in wide use in the United States and throughout the world for packaging beverages, other fluids, and even gels and granular solids.

Typically, such cans are assembled during the manufacturing process by fitting and sealing a prefabricated can end onto an open upper end of a prefabricated can body. FIG. 1 depicts such a can end 10, which typically includes a circumferential end curl portion 12 having an outer edge 14, and an interior shoulder 16 upon which a sealant or adhesive compound 18 may be applied. The circumferential end curl portion 12 is sized and shaped to receive the circular upper lip or rim of the prefabricated can body so that the lip or rim is fitted between the end curl portion 12 and the interior shoulder 16. The sealant or adhesive 18 thus helps provide a pressure-tight seal between the can end 10 and the prefabricated can body, after the circumferential end curl portion 12 is further crimped together with the upper rim or width of the prefabricated can body 12.

An indexing belt 20 having a raised support surface 22 is commonly used to transport the individual can ends 10 to an assembly location where they may be sequentially assembled onto the respective can bodies. As shown in FIG. 1, support portion 22 is sized to fit about the interior shoulder 16 of the can end 12. While effective from a support standpoint, such indexing belts 20 tended to contact and stick to the sealant or adhesive 18 which is generally applied prior to placement of the can end 12 onto the indexing belt 20. Consequently, the can end lo would sometimes tend to adhere to the indexing belt 20, hindering the eventual separation of the can end 10 from the indexing belt 20.

It is clear there has existed a long and unfilled in the art for an improved system and method for transporting can ends having a sealant or adhesive applied thereto from a first work location to a second work location, in such a manner that the sealant or adhesive will not come into contact with the transport mechanism.

SUMMARY OF THE INVENTION

Accordingly, it is an object of the invention to provide an improved system and method for transporting a can end from a first location to a second location, which will not interfere with sealant or adhesive that may be applied to the can end.

It is further an object of the invention to provide an improved system and method for transporting a can end from a first work station to a second work station which protects against lateral displacement of the can end during transport.

To achieve the above and other objects of the invention, a method, according to one aspect of the invention, of transporting a can end of the type which includes a circumferential end curl portion and an interior shoulder so that an upper edge of a prefabricated can body may be fitted between the end curl and interior shoulder to form a sealed can, includes steps of (a) placing the can end on a movable support surface in such a manner that only the circumferential end curl portion of the can end is contacted by the movable support surface; and (b) moving the movable support surface with the can end so supported thereon, whereby the interior shoulder of the can end will not be interfered with by the movable support surface during transport.

According to a second aspect of the invention, an indexing belt for transporting a can end of the type which includes a circumferential end curl portion and an interior shoulder, so that an upper edge of a prefabricated can body may be fitted between the end curl and interior shoulder to form a sealed can, includes a web portion which has at least one opening defined therein; and at least one support surface associated with the opening, said support surface being constructed and arranged so as to contact and support only the circumferential end curl portion of the can end, whereby the interior shoulder of the can end will not be interfered with by the support surface during transport.

These and various other advantages and features of novelty which characterize the invention are pointed out with particularity in the claims annexed hereto and forming a part hereof. However, for a better understanding of the invention, its advantages, and the objects obtained by its use, reference should be made to the drawings which form a further part hereof, and to the accompanying descriptive matter, in which there is illustrated and described a preferred embodiment of the invention.

DETAILED DESCRIPTION OF THE PREFERRED EMBODIMENT(S)

Figure 1:
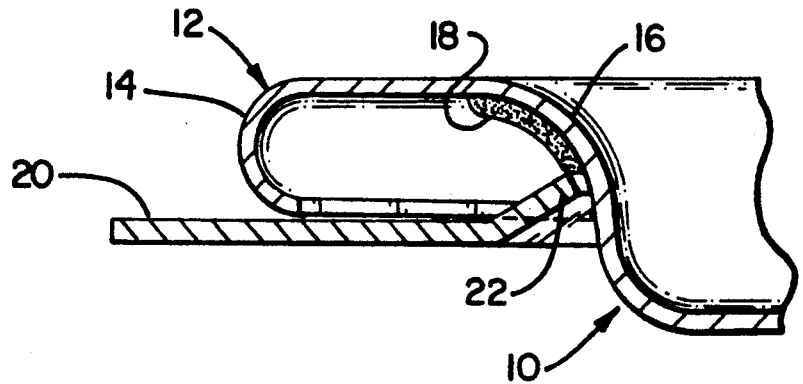
FIG. 1 is a fragmentary cross-sectional view of a can end being transported on an indexing belt constructed according to a prior art design.
Figure 4:
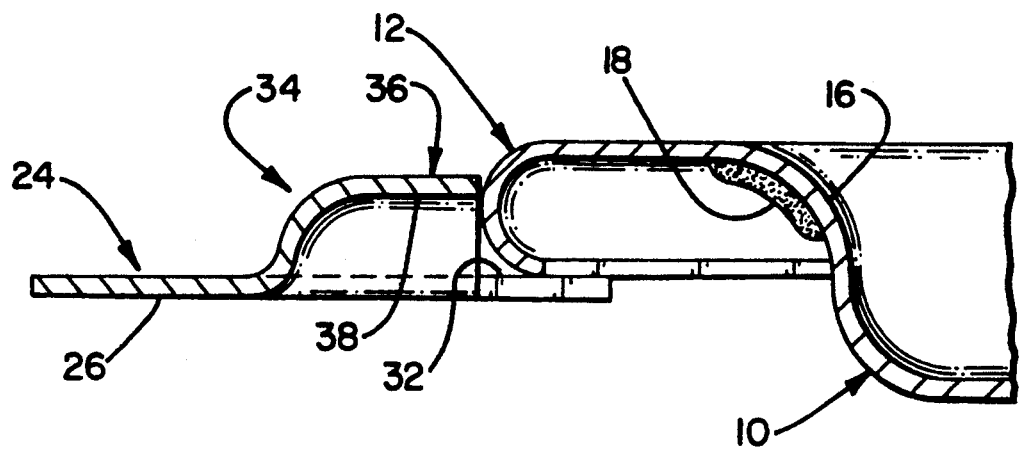
FIG. 4 is a fragmentary cross-sectional view of a can end being transported on an indexing belt constructed according to the embodiment depicted in FIGS. 2 and 3.
Figure 2:
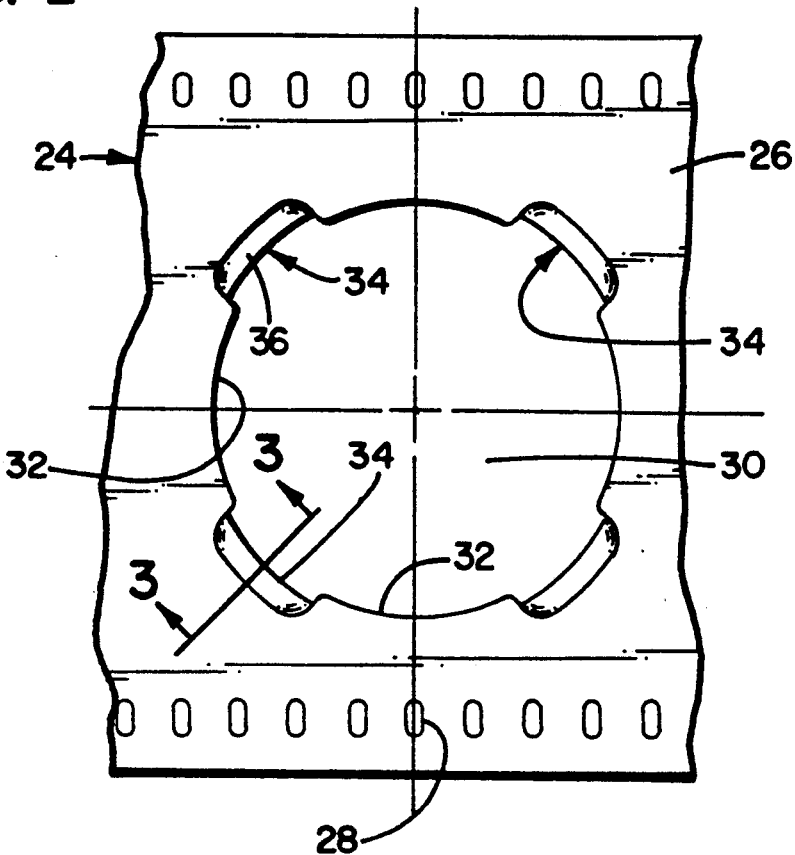
FIG. 2 is a fragmentary top plan view of an indexing belt constructed according to a preferred embodiment of the invention.
Figure 3:
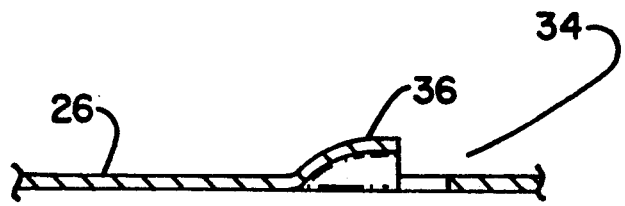
FIG. 3 is a fraqmentary cross-sectional view taken along lines 3—3 in FIG. 2.

Referring now to the drawings, wherein like reference numerals designate corresponding structure throughout the views, and referring in particular to FIGS. 2-4, an improved indexing belt 24 constructed according to a preferred embodiment of the invention includes a web portion 26, which is preferably constructed of a material such as stainless steel. Web portion 26 may have a plurality of timing slots or other projections or indentations defined therein to provide registration or traction with one or more drive pinions or pulleys. Web portion 26 has at least one opening 30 defined therein, as may best be seen in FIG. 2. A plurality of support surfaces 32, which number four in the illustrated embodiment, are disposed about the periphery of the opening 30. In the illustrated embodiment, support surfaces 32 are defined by respective areas of an upper surface of web portion 26 which border on the opening 30. As may best be seen in FIG. 4, the support surfaces 32 are constructed and arranged so as to contact and support only the circumferential end curl portion 12 of the can end 10 and so as not to contact the interior shoulder 16, so that the interior shoulder 16 of the can end will not be interfered with by the support surfaces 32 during transport of the can end 10 on indexing belt 24.

According to a second aspect of the invention, indexing belt 24 further includes structure for preventing lateral displacement of the can end 10 relative to web portion 26 during transport of the can end 10 on indexing belt 24. This structure for preventing lateral displacement includes, in the preferred embodiment, a plurality of lugs 34, which in the illustrated embodiment also number four. Each of the lugs 34 are, in the preferred embodiment, formed of a flange 36 which is unitary with web portion 26 and includes a raised part 38 which resides in a plane that is parallel to the plane in which web portion 26 resides. Raised part 38 is constructed and arranged to contact the outer circumferential edge 14 of end curl portion 12 in order to prevent lateral displacement of the can end 10. Lugs 34 may be formed out of the material of web portion 26 through a dye pressing operation, the details of which will be apparent to those skilled in this technology.

In operation, the sealant or adhesive 18 is preferably applied to the interior shoulder 16 of can end 10 prior to placement of can end 10 on indexing belt 24. Can end 10 is then placed on indexing belt 24 so that the circumferential end curl portion 12 is supported by support surface 32, with outer edge 14 contacting the flange 36 of the respective lugs 34. Can end 10 may then be transported from one work station to another for further processing of the can end 10, culminating in the application of can end 10 onto a prefabricated can body. Such work stations may include the first and second rivet formation steps, securing, pre-beading and the formation of parallel beads, attaching the tab, embossing of lettering and finger space on the can end, and the folding of the pre-bead over the score.

It will be appreciated that, since the improved indexing belt 24 never comes into contact with interior shoulder 16 of can end 10, the indexing belt is less likely to improperly become adhered to the can end 10 than the indexing belt 20, constructed according the prior art design, would have been.

It is to be understood, however, that even though numerous characteristics and advantages of the present invention have been set forth in the foregoing description, together with details of the structure and function of the invention, the disclosure is illustrative only, and changes may be made in detail, especially in matters of shape, size and arrangement of parts within the principles of the invention to the full extent indicated by the broad general meaning of the terms in which the appended claims are expressed.

What is claimed is:

1. An indexing belt for transporting a can end of the type that has an end curl portion with an outer circumferential edge; and an interior shoulder to which an adhesive may be applied, comprising:
   a web portion having at least one opening defined therein that is sized so that said web portion will not contact the interior shoulder of a can end, or any adhesive on the interior shoulder, when the can end is inserted in said opening;
   at least one support surface on an upper surface of said web portion adjacent to said opening for supporting the end curl portion of the can end; and
   means for preventing lateral displacement of the can end relative to said web portion, said means comprising at least one flange, said flange being unitary with and formed out of the same material as said web portion, said flange further including a raised part that extends in a different plane than said web portion, said raised part of said flange being constructed and arranged to abut the outer circumferential edge of the end curl portion of the can end to prevent lateral movement of the can end, whereby the mounting structure for centering said can end with respect to said opening is inexpensively and effectively fabricated from a single piece of material.

2. An indexing belt according to claim 1 wherein said support surface extends substantially within a plane which is parallel to a plane in which said web portion resides.

3. An indexing belt according to claim 1, wherein four of said raised parts and four of said support surfaces are provided.

* * * * *